United States Patent Office 3,428,421
Patented Feb. 18, 1969

---

3,428,421
MANUFACTURE OF DIFLUOROPHOSPHORIC ACID
Robert A. Wiesboeck, Atlanta, Ga., assignor, by mesne assignments, to USS Agri-Chemicals, Inc., Pittsburgh, Pa., a corporation of Delaware
No Drawing. Filed Mar. 20, 1967, Ser. No. 624,188
U.S. Cl. 23—139   8 Claims
Int. Cl. C01b 7/20

ABSTRACT OF THE DISCLOSURE

Difluorophosphoric acid is prepared from dibasic phosphates and a fluorosulfonate salt, such as an alkali or alkaline earth fluorosulfonate. A pulverized mixture of a dibasic phosphate such as, for example, dicalcium phosphate, and a fluorosulfonate such as, for example, calcium fluorosulfonate, are heated to evolve difluorophosphoric acid vapors and the acid vapors collected.

CROSS REFERENCE TO RELATED APPLICATION

This application is related to my copending application Ser. No. 566,197 filed July 19, 1966.

BRIEF SUMMARY OF THE INVENTION

Known procedures for the preparation of difluorophosphoric acid involve the reaction of phosphorus pentoxide with hydrogen fluoride. The resulting product consists of a mixture of mono- and difluorophosphoric acid.

$$P_2O_5 + 3HF \rightarrow HPO_2F_2 + H_2PO_3F$$

Only one-half of the phosphorus value of the $P_2O_5$ employed is recovered as difluorophosphoric acid which is distilled under vacuum from the reaction mixture.

Another method produces difluorophosphoric acid from phosphoryl fluoride by hydrolysis, but the high cost of phosphoryl fluoride makes this procedure economically unattractive.

$$POF_3 + H_2O \rightarrow HPO_2F_2 + HF$$

In my process, a pulverized mixture of a dibasic phosphate and an alkali or alkaline earth fluorosulfonate is heated to about 150–350° C., preferably about 250° C., and the volatile product recovered as difluorophosphoric acid. During the heating period, atmospheric moisture must be excluded by a stream of nitrogen or other inert gas. The gaseous product may be vented into a cold trap for the recovery of the difluorophosphoric acid.

I have discovered that difluorophosphoric acid can be prepared by the use of inexpensive raw materials in simple operations involving only mixing and heating of two solids while obtaining anhydrous difluorophosphoric acid in over 95 percent purity directly from the reactor and without resorting to expensive distillation equipment now necessary in present processes. Further, I employ a less corrosive reaction system than that of conventional methods.

DETAILED DESCRIPTION

A dibasic phosphate and an alkali or alkaline earth fluorosulfonate are intimately mixed by grinding in a dry atmosphere. The mixture is transferred to a reactor and heated to a temperature at which difluorophosphoric acid vapors are evolved and the vapors are collected. I prefer to heat the mixture to about 150° C. or higher, the preferred temperature being about 250° C. It is advantageous to employ freshly prepared fluorosulfonate in stoichiometric quantity. The heating of the reaction mixture may be carried out in a closed or vented system, allowing the volatile product to accumulate or to vent off into a condenser. Teflon is believed to be the most satisfactory reactor material, but the reactor may be formed of stainless steel or other suitable material. I prefer to employ a reaction time of about 2–5 hours depending on the selected temperature.

By way of example, a pulverized mixture of dicalcium phosphate and calcium fluorosulfonate was heated to about 250° C. for about 2 hours, producing difluorophosphoric acid in 60–70 percent yield. Calcium fluorosulfonate is particularly useful in comparison with other fluorosulfonate salts because less caking of the reaction bed occurs and a greater yield is obtained.

In the specific illustration given, the reaction is illustrated for the calcium salt by the following equation:

$$CaHPO_4 + Ca(FSO_3)_2 \rightarrow HPO_2F_2 + 2CaSO_4$$

Difluorophosphoric acid begins to distill from the reactants on heating to 150–350° C., and the anhydrous acid is obtained in high purity as a colorless liquid.

Alkali fluorosulfonates and alkali phosphates also produce difluorophosphoric acid and may be heated in the range of 150–350° C. for the production of difluorophosphoric acid.

Specific examples illustrative of the process may be set out as follows:

EXAMPLE I

Pulverized c.p. dicalcium phosphate (13.6 g.) was intimately mixed with freshly prepared calcium fluorosulfonate (23.2 g.) by grinding in a mortar in a dry atmosphere. The mixture was transferred to a 250 ml. Teflon reactor and gradually heated to 250° C. The volatile reaction product was condensed into a cold trap (0° C.) made of Teflon. Atmospheric moisture was excluded by a stream of nitrogen. After heating the reaction mixture to 250° C. for 5 hours, a total of 5.9 g. difluorophosphoric acid was obtained. The reaction bed was in the form of a free flowing powder.

EXAMPLE II

A pulverized mixture of c.p. dicalcium phosphate (27.2 g.) and calcium fluorosulfonate (50.0 g.) was heated in an autoclave to 250° C. for 2 hours. A pressure of 110 p.s.i. developed. Subsequent venting into a cold trap (0° C.) and pumping produced 13.3 g. of difluorophosphoric acid.

EXAMPLE III

Dibasic sodium phosphate (14.2 g.) and sodium fluorosulfonate (24.4 g.) were mixed intimately by grinding in a mortar. The powder was transferred to a Teflon reactor and heated to 250° C. for three hours. The volatile reaction product was allowed to expand into a cold trap (0° C.). After completion of the heating, the reactor was swept by a stream of dry nitrogen to move all product into the trap. A total of 4.8 g. of difluorophosphoric acid was obtained. The reaction bed was a very hard lump.

While in the foregoing specification I have set forth specific procedure in considerable detail for the purpose of illustrating embodiments of the invention, it will be understood that such details may be varied widely by those skilled in the art without departing from the spirit of my invention.

I claim:
1. In a process for the preparation of difluorophosphoric acid, the steps of heating in the absence of moisture a pulverized mixture of a fluorosulfonate salt selected from the group consisting of alkali and alkaline earth fluorosulfonates and a dibasic phosphate selected from the group consisting of calcium and sodium to a temperature of about 150–350° C. at which difluorophosphoric acid vapors are evolved, and collecting said vapors.

2. The process of claim 1 in which the fluorosulfonate is freshly prepared fluorosulfonate.

3. The process in claim 1 in which the fluorosulfonate salt is calcium fluorosulfonate.

4. The process of claim 1 in which the salt is sodium fluorosulfonate.

5. The process of claim 1 in which the pulverized mixture is a mixture of dicalcium phosphate and calcium fluorosulfonate.

6. The process of claim 1 in which the pulverized mixture is a mixture of dibasic sodium phosphate and sodium fluorosulfonate.

7. In a process for the preparation of difluorophosphoric acid, the steps of grinding a fluorosulfonate salt selected from the group consisting of alkali and alkaline earth fluorosulfonates and a dibasic phosphate selected from the group consisting of calcium and sodium, mixing the ground materials, and heating the same to a temperature of about 150–350° C. to evolve difluorophosphoric acid vapors while excluding atmospheric moisture by sweeping with an inert gas.

8. The process of claim 7 in which the phosphate is dicalcium phosphate and the fluorosulfonate is calcium fluorosulfonate and the mixture is heated in a closed vessel under superatmospheric pressure to a temperature of about 250° C.

References Cited

UNITED STATES PATENTS

| | | | |
|---|---|---|---|
| 2,408,785 | 10/1946 | Lange | 23—139 |
| 2,423,895 | 7/1947 | Lange et al. | 23—139 |
| 2,488,298 | 11/1949 | Lange et al. | 23—139 |

OTHER REFERENCES

Lange et al., "Chemical Abstracts," vol. 41, p. 4397, 1947.

OSCAR R. VERTIZ, *Primary Examiner.*

HERBERT T. CARTER, *Assistant Examiner.*